July 26, 1932.  W. H. GREEN ET AL  1,869,144
LIQUID TREATMENT
Filed Aug. 20, 1928
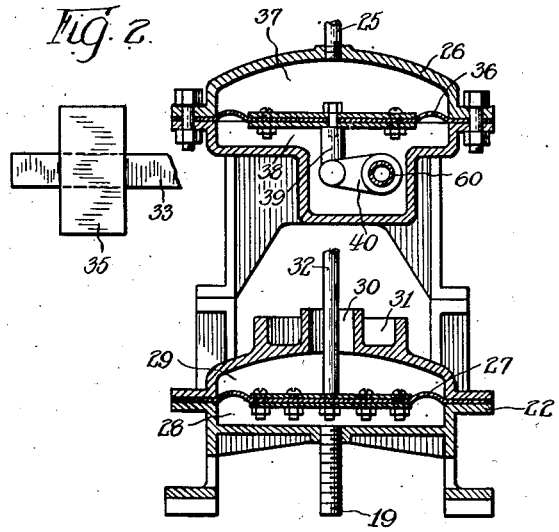
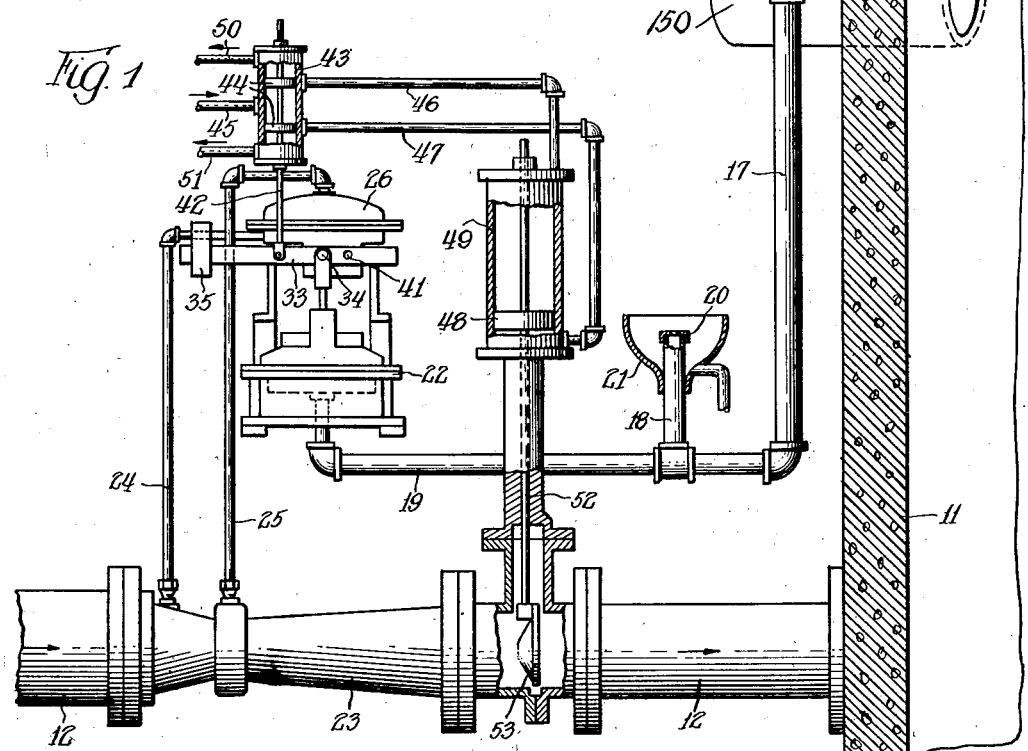
Inventors
Walter H. Green,
Samuel L. Adelson,
By Cromwell, Greist & Warden
Attys.

Patented July 26, 1932

1,869,144

UNITED STATES PATENT OFFICE

WALTER H. GREEN AND SAMUEL L. ADELSON, OF CHICAGO, ILLINOIS, ASSIGNOR TO GENERAL ZEOLITE COMPANY, OF CHICAGO, ILLINOIS, A CORPORATION OF ILLINOIS

LIQUID TREATMENT

Application filed August 20, 1928. Serial No. 300,774.

This invention relates to level control especially in connection with liquid treatment, and it is particularly adapted for use in connection with large sedimentation or settling basins. The invention will be specifically described in connection with the latter application, but it will be obvious that it is capable of wide application.

Natural waters, as taken from streams, lakes, or rivers, usually contain an objectionable amount of suspended matter and are commonly run into a basin to settle before being withdrawn for further clarification or use. The amount of water drawn from one of these basins or chambers will constantly vary, due to changes in the demand for water. This is characteristic of municipal filtering plants. It is very desirable to maintain a substantially constant level or head of water with small variations only in such collecting or sedimentation basins. It is also desirable to regulate the level in the basin by some apparatus which is actuated by means of the variation in the level itself. Apparatus of this character may control the level in the basin by means of opening or closing the influent line thereto so as to increase or to decrease the flow respectively until the proper level has been reached.

Much difficulty has been experienced with controls of this character. The control frequently tends to over-regulate or to "hunt". When the level of the water in the basin rises above the operating level which it is desired to maintain, the valve will frequently totally close the influent line, and will not be opened again by the level-actuated controlling means until the water in the basin has passed below the desired operating level. On the other hand, when the water in the basin is below the operating level, the valve will be opened wide by the controlling means permitting a heavy inrush of water and the basin may overflow before the level-actuated controlling means will close the valve. Such extreme or rapid variation in flow is objectionable as tending to interfere with proper sedimentation conditions and also because it produces undesirable pumping conditions.

An object of the present invention is to provide a level control which is responsive to small changes in the liquid level and by which a liquid level will be maintained substantially constant within a small variation.

Another object is to provide means for controlling a basin level that is quickly responsive to changes in either the liquid level or the rate of inflow.

A further object of this invention is to provide a level control which is substantially free of the over-regulation or hunting and which will prevent too great an increase in the rate of inflow of liquid when the level is below the desired operating level and too great a decrease in the rate of inflow when the level is above the desired operating level.

A still further object of this invention is to provide level control means for a settling or sedimentation basin which will adjust the rate of inflow to the rate of outflow while maintaining a substantially constant level in the basin.

Other objects will appear during the course of the following description.

In the present invention the basin level control may be actuated primarily by an impulse resulting from a change in liquid level, the effect of this impulse being modified by an impulse derived from the flow into the basin with the result that relatively uniform operating conditions free from rapid fluctuations of level or flow are established. In one embodiment of this invention to be described, a differential pressure device is placed upon the influent line to a settling or sedimentation basin and is operatively connected to a gate or butterfly valve. The arrangement tends to close the valve with increased flow through the line and to open the valve with decreased flow through the line. The gate or butterfly valve is also operatively connected to the head in the basin in such a manner that a decrease in head tends to open the valve and an increase in head tends to close the valve. The position of the valve, which controls the flow through the influent line, is thus regulated jointly by the differential pressure device on the influent line and by the basin head controlled means.

In the drawing forming a part of this application is shown one embodiment of the invention to which the invention is by no means restricted:

Figure 1 is an arrangement showing an apparatus for controlling the level wherein a gate valve is used to control the amount of water passing through the influent line; and Figure 2 is a detailed showing of the interconnected diaphragm chambers.

The water passes into the collecting or settling basin 11 through the influent line or inlet 12. The normal level of the water in the basin is indicated at 13 and the variation in level is indicated by the dotted lines at 13a and 13b. The cylindrical chamber 14 is placed in vertical position in the collecting basin 11 and is provided with an orifice 15. The orifice 15 should be located at or slightly below the low level 13b. The cylindrical chamber 14 is provided with the vent pipe 16 which extends to a point above the high level 13a. The water which flows into the chamber 14 through the orifice 15 is conducted by the line 17 to the line 18. The line 18 terminates in the orifice 20 which is of smaller size than the orifice 15 in the chamber 14. When the level in the basin 11 is above the orifice 15, the head of water builds up in the line 17 until the discharge through the orifice 20 equals the inflow through 15 and this head is transmitted through the pipe 19 to the lower compartment of the diaphragm chamber 22. In the present arrangement both orifices are in a horizontal plane and face upwardly. The overflow from the orifice 20 is caught in the receiver 21 and run off to waste.

In the influent line 12 is a Venturi tube 23. The upstream side of the Venturi tube and the throat portion of the Venturi tube are connected to the lower and upper compartments of the diaphragm chamber 26 by the lines 24 and 25 respectively.

The two diaphragm chambers 22 and 26 vary somewhat in construction and are much more fully shown in Figure 2. The diaphragm chamber 22 contains a diaphragm 27 and a lower compartment 28 to which is conveyed the head of water by the line 19. The upper compartment 29 is open to the atmosphere through the annular opening 30 and is kept filled with water by having a small connection made to waste lines 50 and 51 through which connection water drips into the compartment. Encircling the annular opening 30 is a gutter 31 for catching any of the water caused to flow over by the movement of the diaphragm 27. The rod 32 is connected to the center of the diaphragm and is pivoted to the lever 33 at the point 34 (see Figure 1). The lever 33 is provided with an adjustable weight 35 which may be moved along the lever to change its moment. The upper diaphragm chamber 26 contains an upper compartment 37 which is connected to the throat of the Venturi tube 23 by the line 25 and the lower compartment 38 which is connected to the up-stream side of the Venturi tube 23 by the line 24. The diaphragm 36 is connected by a link 39 and the lever 40 to a shaft 60 which passes through the diaphragm casing and is operatively attached to the lever 33 at the point 41 (see Figure 1).

Also attached to the lever 33 is the piston rod 42 of the pilot valve 43 (see Figure 1). The movement of the lever 33 actuates the double piston 44 and causes it to move up or down within the pilot valve cylinder 43. Water under pressure is admitted to the cylinder 43 by the line 45 and is conducted either to the line 46 or the line 47 depending upon whether the piston 44 is above or below its normal position. The pipe line 46 admits water to the upper side and the pipe line 47 admits water to the lower side of the piston 48 which moves up or down in the cylinder 49. When the liquid under pressure passes through the line 46 to the upper side of cylinder 49, the water is wasted from the lower part of cylinder 49 through line 47 and the lower compartment of the pilot valve 43 into the outlet 51. When the water is being admitted under pressure through the line 47 to the lower side of the cylinder 49, the water in the upper portion of the cylinder 49 passes through the pipe 46 and the upper part of the pilot valve cylinder 43 into the pipe 50 to waste. The piston rod 52 of the piston 48 is directly connected to a gate valve 53 which regulates the amount of flow through the influent line 12. It will be noted that the gate valve 53 is placed at a point in the line 12 after the Venturi tube 23 so that there will be no disturbance in the Venturi tube resulting therefrom.

The operation is as follows: The weight 35 is adjusted on the lever 33 so that when the water in the basin 11 is at the upper level 13a the downward moment of the weight is just balanced by the upward thrust of the lower diaphragm 27. At any lower level in the basin the moment of the weight will overcome the upward thrust of the lower diaphragm 27 and the weight will descend, moving the piston in the pilot valve downwardly by means of lever 33 and rod 42. This will cause water under pressure to flow through line 47 into the bottom of cylinder 49 causing piston 48 to move upwardly opening valve 53 and thus permitting a flow through pipe 12. This will tend to raise the level in 11 but at the same time a differential pressure is created on diaphragm 36 which increases as the flow increases. This differential pressure acts in the same direction as the pressure on the lower diaphragm 27. The sum of these two forces will raise the weight 35 when a certain flow and level is reached thus throwing the pilot valve 43 into neutral position and stopping further movement of gate valve 53. The equilibrium thus established will exist until a change occurs in the level in the basin 11 or in the flow through pipe 12.

If now the use of water from basin 11 should decrease, the level in the basin will rise, increasing the pressure under the lower diaphragm 27, causing weight 35 to rise and operate pilot valve 43, and decreasing the opening of gate valve 53. As valve 53 closes, the flow through the line 12 is cut down and the differential pressure acting on the upper diaphragm 36 decreases until the moment of weight 35 overcomes the upward thrust of the two diaphragms and again moves the pilot valve into neutral position stopping movement of the gate valve 53.

It is thus evident that for any level in basin 11 there is a corresponding flow through pipe 12 and a differential pressure resulting therefrom such that the thrust of the two diaphragms will just equal the moment of weight 35. If the level in the basin is high, the differential pressure and related flow through the line 12 will be low and conversely if the level in 11 is low the differential pressure and the flow causing it must be high. The effect is ultimately to adjust the rate of flow into the basin approximately to an equality with the rate of withdrawal from the basin, the level in the basin varying within small predetermined limits.

It is useful to make the orifice 20 of smaller area than orifice 15. The effect of variation in the level in the basin is then magnified so that the device both responds more quickly and also is more sensitive. If orifice 20 be made one-half the diameter of the orifice 15, it will have one-fourth the area to discharge the water entering the conduit 17 by the orifice 15. Thus a head or change of head of 1 inch over the orifice 15 produces a head or change of head under the diaphragm 27 of 16 inches. Orifice 15 may be set at the level 13b or it may be positiond somewhat lower as shown. The position should be such, however, that when the level in 11 is lowered to 13b, the flow through 15 will decrease to a point such that gate valve 53 will open admitting to the basin the full flow available through the line 12.

The level control of the present invention substantially eliminates hunting and over-regulation. When the level in the chamber or basin 11 changes, the gate valve will tend to readily adjust itself to admit an increased or decreased amount of influent water to restore or maintain a level at which the influent into the basin will equal the effluent therefrom.

It will be apparent from the preceding description that if the Venturi tube in the inlet line and the diaphragm associated with it were omitted the remainder of the device would still serve to maintain the level in the basin within fairly close limits. Within these limits, however, sudden and rapid changes of level would tend to occur since the valve 53 then tends to open wide or close tight under the impulses received by it creating a sort of rocking action. Such an action has been a characteristic fault of previous level controls. The impulse derived from the Venturi tube and its associated diaphragm so counteracts the impulses from the basin that while changes take place promptly they are gradual and proportionate.

The specific embodiment of this invention shows the Venturi tube 23 and the gate valve 53 in the influent line to a collecting basin or chamber 11. They may be placed in other positions if desired, and other flow measuring or differential pressure devices and other valve apparatus may be utilized.

One of the principal advantages of this invention is that the influent to the basin will ultimately always be equal to the effluent from the basin with the result that as long as the effluent remains unchanged the level in the basin will remain unchanged. When the effluent increases, the level decreases and the influent thereupon also increases until it reaches the point where it is again equivalent to the effluent. A reverse cycle of operation also takes place when the effluent decreases. During all changes the level in the basin is maintained within a certain small variation which will always give a desired rating to the overflow weir of the basin and which will also prevent the basin from flooding.

Another great advantage is that a method of control is provided that is responsive to changes in the rate of inflow as well as in the basin level itself whereby the level is maintained uniform even though other operating conditions such as the pressure in the supply line should vary.

Still another great advantage is that a method of control is provided which does away with any mechanical connections between the valve in the line to the basin and the actuating elements. This makes remote control possible and obviates the necessity for links, cables, etc. between the moving parts, such links, etc. being, in addition, unsightly in a well kept plant.

The outlet from the basin is shown diagrammatically upon Figure 1 and is designated by the numeral 150. The outlet has been shown in this particular position in order to conserve space, but it is obvious that it may readily be placed so as to connect with some other portion of the basin 11. Under the expression "pressure responsive apparatus" utilized in the accompanying claims is included the double diaphragm device shown upon Figure 2 and other equivalent mechanisms.

What is claimed is:

1. In a level control for a sedimentation basin, an inlet into the basin, an outlet from the basin, and a means for controlling the inflow through the inlet, said controlling means comprising a hydraulic valve on said inlet, an intake orifice within the basin below the normal variation in liquid level, an outlet orifice at a lower level than the inlet orifice of smaller diameter than the first mentioned orifice and communicating with said first mentioned orifice, the line connecting the orifices communicating with a diaphragm, a Venturi tube on the influent line, another diaphragm which is actuated by the pressure difference set up by the Venturi tube, a lever operatively connected to said diaphragms provided with a counterweight the moment of which is adapted to oppose said diaphragms, and a pilot valve actuated from said lever, said pilot valve supplying fluid under pressure to the hydraulic cylinder which actuates the valve in the influent line.

2. In a level control for a sedimentation basin, an inlet into the basin, an outlet from the basin, and means for controlling the flow through the basin, said controlling means comprising a valve, an intake orifice within the basin below the normal variation in liquid level, an outlet orifice at a lower level than the inlet orifice of smaller diameter than the first mentioned orifice and communicating with said first mentioned orifice, the line connecting the orifices communicating with a pressure responsive device, means responsive to the flow through the valve, and means adapted to actuate said valve operatively connected to said pressure responsive device and to said flow responsive means.

3. In a level control for a sedimentation basin, an inlet into the basin, an outlet from the basin, and means for controlling the flow through the basin, said controlling means comprising a valve, an intake orifice within the basin below the normal variation in liquid level, a line connecting said orifice to a pressure responsive device, means to appraise the flow to the basin and means to actuate said valve simultaneously controlled by the pressure responsive device and the appraising means.

4. In a level control for a sedimentation basin, an inlet into the basin, an outlet from the basin, and means for controlling the flow through the basin, said controlling means comprising a valve on said inlet, means responsive to the head of liquid above a given level within the basin, a diaphragm actuated by said head responsive means, a Venturi tube on the influent line, another diaphragm which is actuated by the pressure difference set up by the Venturi tube, a lever operatively connected to said diaphragms provided with a counterweight the moment of which is adapted to oppose said diaphragms, and a pilot valve actuated from said lever, said pilot valve supplying fluid under pressure to the hydraulic cylinder which actuates the valve in the influent line.

5. A method for controlling the level of fluid in a chamber, which comprises deriving a differential pressure from the inflow of liquid to the chamber, deriving a second pressure from a minor flow from the chamber, combining the two pressures, and regulating the liquid inflow by said combined pressures.

6. A method for controlling the inflow of liquid to a chamber, which comprises deriving a differential pressure from the inflow, deriving a second pressure from a minor flow from the chamber, combining said pressures, and regulatng the inflow thereby in a manner to maintain the sum of the combined pressures substantially constant.

7. A device of the character described, comprising a liquid container, an outlet conduit communicating with said container, an inlet conduit communicating with said container, a differential pressure creating device in said inlet conduit, a valve in said inlet conduit, a reciprocal pressure responsive device, means responsive to the head of liquid above a given level in said container and operatively connected to one side of the pressure responsive device, a connection between the upstream side of said differential pressure creating device and said one side of the pressure responsive device, a connection between the low pressure side of said differential pressure creating device and the opposite side of said pressure responsive device, and means actuated by said pressure responsive device for controlling said valve.

8. In a device of the character described, a liquid container having an inlet conduit communicating therewith, a Venturi tube in said conduit, pressure means responsive to the head of liquid above a given level in said container, means for combining the differential pressure of said Venturi tube with said head responsive pressure means, and means for controlling the inflow through said conduit by said combination.

In testimony whereof we have hereunto subscribed our names.

WALTER H. GREEN.
SAMUEL L. ADELSON.